United States Patent Office 3,746,552
Patented July 17, 1973

3,746,552
EDIBLE WHIPPABLE TOPPING COMPOSITIONS CONTAINING A POLYOXYALKYLENE DERIVATIVE OF A POLYGLYCEROL HIGHER FATTY ACID ESTER
Richard J. Zielinski, Middleburg Heights, and Cecilia Gilmore, Rock River, Ohio, assignors to SCM Corporation, Cleveland, Ohio
No Drawing. Filed Jan. 4, 1971, Ser. No. 103,857
Int. Cl. A23g 3/00
U.S. Cl. 99—139
6 Claims

ABSTRACT OF THE DISCLOSURE

Edible whippable topping compositions of the non-dairy type comprising fat, protein, water, and emulsifier, having excellent resistance of emulsion breakdown or phase separation on thawing after a freeze cycle are set forth. Such resistance is obtained by including as a part of the emulsifier in the composition a polyoxyalkylene derivative of a polyglycerol higher fatty acid ester.

In the non-dairy type whippable toppings, there are basically three types of toppings constituting the major proportion of the commercial market. One type is the dry topping mix wherein fat, protein, thickener and water are first emulsified, then spray dried. The dry product is sold to the homemaker, the homemaker reconstituting the dry product with water or milk and whipping to form a whipped topping. This type of whipped topping lacked commercial appeal because it resulted in inconveniences to the homemaker.

Another type of whipped topping and highly successful, is the prewhipped topping wherein a topping is prepared; e.g., by homogenizing fat, water, protein, etc. to form an emulsion, then this emulsion is whipped and frozen for storage and ultimate marketing. Such a whippable topping composition is shown in U.S. Pat. 3,431,117.

The fluid whippable topping to which this invention relates is prepared by mixing fat, water, and thickener, protein and emulsifier and homogenizing the mixture to emulsify the composition. The emulsion is frozen for storage and marketed in its frozen state. In using the fluid whippable topping, the homemaker allows the topping to thaw and then whips. One of the primary disadvantages of the fluid whippable topping was that the emulsion was not freeze-thaw stable, that is, the emulsion on thawing broke down to form a lipid phase and water phase. As a result, the emulsion of such breakdown could not be whipped.

Various emulsifiers, such as monoglycerides, Tweens; e.g., polyoxyethylene sorbitan monostearate, glycerol lactopalmitate, etc. have been employed in amounts from about 0.5 to 1½% by weight of the composition in order to reduce the problem of emulsion breakdown. However, these emulsifiers have not been highly successful as the emulsion breaks down on thawing from a temperature of $-20°$ F. to $40°$ F. The separated product then cannot be whipped. Additionally, specific gravity of the whipped topping taken immediately after whipping often has been unacceptable.

This invention, which relates to a fluid whippable topping, has many advantages, a particular one being that the emulsifier is economical for producing a commercial whippable topping. Additionally, the fluid whippable topping can be frozen for an indefinite period of time, then thawed and whipped to form the edible topping, the whippable topping on thawing is resistant to emulsion breakdown and on whipping is resistant to syneresis (separation of liquid from the whipped topping). The whipped topping also has a desirable specific gravity in the whipped form and a desirably dry appearance.

This invention relates to an improvement in topping composition the improvement comprising including as the emulsifier at least 50% of a polyoxyalkylene derivative of polyglycerol higher fatty acid ester.

By a polyoxyalkylene derivative of a polyglycerol higher fatty acid ester, it is meant to refer to the ethylene and propylene oxide condensation products of a polyglycerol higher fatty acid ester. Although propylene oxide can be employed in forming the condensation product, it is not normally used for reasons of efficiency and economy. Generally, not substantially more than 20% propylene oxide basis weight of the ethylene oxide used in forming the condensation product, and preferably no propylene oxide is employed as the alkylene oxide. Thus, the preferred polyoxyalkylene derivative of a polyglycerol higher fatty acid ester is a polyoxyethylene derivative.

Polyglycerol esters are known and widely used as emulsifiers in the synthesis of edible comestibles. Virtually, any of the types used for food products can be used in the formation of the emulsifier for the whippable topping here. Typically, these polyglycerol esters have anywhere from 2–30 glycerol units in the chain. However, they generally and preferably have from 2–10 glycerol units on the average when used in preparing food products. Virtually, any of the polyglycerol esters used for making food products can be used for making the polyoxyalkylene derivative. For reasons of efficiency and economy, triglycerol monosterate is the preferred polyglycerol ester used in making such derivative.

One of the primary methods of preparing polyglycerol esters is to first preform the polyglycerol unit by polymerizing glycerol in the presence of alkaline catalyst such as sodium hydroxide at a temperature of from about $250°–270°$ C., then esterify the polyglycerol unit with a fatty acid. The resultant polyglycerol ester product, of course, is not a single polyglycerol polymer, but contains a combination of polymers. However, for reasons of efficiency and economy, the conditions are controlled in order to produce an ester referred to as "triglycerol monostearate."

The polyoxyalkylene derivatives of the polyglycerol higher fatty acid esters can also be prepared in several ways. One of the ways is to react the polyglycerol mixture with the alkylene oxide, then react the polyoxyalkylene derivative with either a fatty acid, a fatty acid halide or glyceride; e.g., mono-, di-, or triglyceride to form the ester. Another method is to first form the polyglycerol ester, then react this product with alkylene oxide. In both types of reactions an alkaline catalyst; e.g., sodium hydroxide, or potassium hydroxide is normally used to accomplish polymerization of the glycerol molecule and to effect condensation and esterification. Of course, it is to be understood that pure products seldom are produced by such reactions. The reaction product may contain slight amounts of polyglycerol ester, mono-, and di-esters or polyglycerol, and the like, but the major proportion of the reaction product is a polyoxyalkylene derivative of a polyglycerol higher fatty acid ester.

Typical analysis of the product ethoxylated triglycerol monosterate shows a hydroxyl number of 140–180 and an ester number of from 40–65 and acid value not substantially more than 2 and usually less than 1.

The molar proportion of alkylene oxide in the polyoxyalkylene polyglycerol higher fatty acid ester typically is between 10 and 50 moles alkylene oxide per mole of polyglycerol and for reasons of efficiency and economy, the molar proportion should be between about 18 and 22 moles alkylene oxide (preferably, ethylene oxide) per mole of polyglycerol ester.

The ester portion of the polyoxyethylene derivative of polyglycerol is supplied by a higher fatty acid or higher fatty acid radical-supplying material; e.g., a glyceride. By a higher fatty acid ester, it is meant those esters where the fatty acid radical portion has between 12 and 22 carbon atoms in the structure. The fatty acid can be saturated or unsaturated and typically is selected from oleic, stearic, behenic, palmitic, and other fatty acids well known in the art.

Other additives in conjunction with the polyoxyalkylene derivative of polyglycerol higher fatty acid esters can be employed in making the whippable topping. Suitable additives include those conventionally used for making whippable topping; e.g., alpha monoglyceride and diglycerides, calcium stearoyl 2-lactylate, propylene glycol mono-esters; e.g., propylene glycol lactostearate, propylene glycol monostearate, ethoxylated monoglyceride, and the like. It has been found that excellent results are obtained when the polyoxyethylene derivative of polyglycerol mono-esters is combined with alpha monoglyceride in a ratio of from 50 parts polyoxyethylene derivative of polyglycerol mono-esters to 50 parts alpha monoglyceride to about 65 parts alpha monoglyceride to 35 parts of polyoxyethylene derivative of polyglycerol mono-esters.

Although the other additives can be incorporated into the emulsifier set forth, it is preferred that at least 40% of the emulsifier comprise the polyoxyalkylene derivative of a polyglycerol higher fatty acid ester and preferably at least 80% and above, except where the polyoxyalkylene derivative is combined with the alpha-monoglyceride. Then the proportion as set forth in the ranges before stated are preferred.

The fat employed in preparing the fluid whippable topping compositions can be any of the natural animal or vegetable fats or oils commonly employed in food products. Thus, any combination of edible oils, semisolid or solid fats, can be employed. Such fats or oils may be fully or partially hydrogenated. Suitable fats include lard, modified lard, margarine, as well as various vegetable and animal oils. Also, hard butters such as lauric hard butters, for example, rearranged palm kernel oil having high lauric fatty acid content, are included. Further description of hard butters including the lauric hard butters is found in U.S. Pats. 2,726,158 and 2,972,541 and such description is hereby incorporated by reference. Thus, oils such as coconut oil, palm kernel oil, cottonseed oil, peanut oil, olive oil, corn oil, and the like may be utilized. Preferably, the fat is low melting and has desired melt-away characteristics at mouth temperature.

The protein which may be employed may be any of a large group including non-fat milk solids, water soluble soy protein derivatives, egg albumen, gelatin, sodium caseinate, calcium caseinate, and the like, and mixtures thereof. The protein apparently serves to effect stabilization of the whippable topping composition.

Thickeners are also desirably included in the fluid whippable topping compositions. Such thickener is preferably a natural; i.e., vegetable or synthetic gum and may be, for example, carrageenin, guar gum, alginate, and the like, or carboxymethyl-cellulose, methylcellulose ether and the like, and mixtures thereof.

Broadly, the polyoxyethylene derivatives of a polyglycerol higher fatty acid ester is included in the whippable topping composition in an amount of from about 0.25–1.5% by weight, and preferably from 0.6–0.9% by weight of the topping composition. Higher percentages often do not afford significant stability increases and tend to impart an emulsifier-like taste to the product. On the other hand, when less than 0.25% of the polyoxyethylene derivative of a polyglycerol higher fatty acid ester is used in forming the fluid whippable topping composition, the resistance to emulsion breakdown and syneresis often diminishes substantially, and specific gravity often increases to undesirable levels.

Fluid whippable topping compositions normally contain from about 20–30% of an edible fat, from about 0.5–2% protein, from about 0.25–1.5% of an emulsifier, from about 0.5–2% of a thickener, from about 40–65% water, and from about 10–30% sugar, all percents basis weight of the composition. Optionally, other materials; e.g., spices, condiments, flavorants, etc. can be included in the whippable topping composition as desired.

The following examples are provided to illustrate preferred embodiments of the invention but are not intended to limit the scope thereof. All parts are parts by weight, all percentages are weight percentages, and all degrees are degrees Fahrenheit, unless otherwise specified.

EXAMPLE 1

Preparation of ethoxylated triglycerol monostearate

One mole of triglycerol monostearate is charged to a reaction vessel and melted by heating to a temperature of 320° F. A dry nitrogen gas sweep is passed through the contents for about 15 minutes to remove substantially all traces of water and oxygen. After removal of the water and all but trace amounts of oxygen, 20 moles ethylene oxide are gradually charged to the vessel. The pressure is maintained between 40–60 p.s.i.g. during addition of the ethylene oxide. The ethoxylation reaction is allowed to proceed at a temperature between about 320–340° F. until all of the ethylene oxide has been added and the pressure drops to around 0–20 p.s.i.g. At the completion of the reaction, the product is cooled to room temperature (70° F.) and neutralized with phosphoric acid.

EXAMPLE 2

A polyoxyethylene derivative of triglycerol monostearate is prepared as follows: one mole of a nominal triglycerol and $\frac{1}{200}$ mole potassium hydroxide are charged to a reaction vessel and heated to a temperature of 320° F. Then 20 moles of ethylene oxide are gradually charged to the vessel, the pressure being maintained at about 40–60 p.s.i.g. during addition of the ethylene oxide. The temperature is maintained at 320°–340° F. until substantially all of the ethylene oxide is reacted. Then the product is cooled to a temperature of 250° F. Then one mole of stearic acid is charged to the vessel and the contents heated to 500° F. and the water formed is removed. The reaction is discontinued when the acid value reaches two or lower.

EXAMPLE 3

Preparation of the edible, fluid whippable topping

A standard formula for a fluid whippable topping is prepared from the following ingredients:

| Dry ingredients: | Parts |
|---|---|
| Sugar-sucrose | 10 |
| Sodium caseinate (protein) | 2 |
| Stabilizer (89% microcrystalline cellulose—11% sodium carboxymethylcellulose) | 0.5 |
| Lauric hard butter (rearranged palm (fat) kernel oil) | 18 |
| Hydrogenated coconut oil (fat) | 9 |
| Emulsifier | 0.3–1.5 |
| Water | 61 |

In forming the whippable topping, the dry ingredients, except the fat-emulsifier are first mixed in a vessel to form a substantially homogeneous dispersion. The dry ingredients are added to the water in a second vessel, agitated, and heated to 130° F. The fat and emulsifier portions then are heated to melting temperature of about 140° F. and added to the second vessel. The resultant contents are heated to pasteurization temperature of 160° for 30 minutes. The heated mix is passed through a conventional two-stage homogenizer, the first stage being operated at a pressure of 1,000 p.s.i.g. and the second stage being operated at a pressure of 500 p.s.i.g. The second stage is not necessary, but is desirable to break up any agglomerates formed in the first stage. The homogenized mix is cooled to 40° F. and the cooled mix then frozen to about −20° F. for storage. The whippable topping is formed by allowing the frozen homogenized product to thaw to a temperature of 40° F. and whipped with a household mixer.

Table I below represents the results of several whipped toppings prepared by the above procedure. The 40° F. storage temperature refers to the homogenized product cooled to 40° F. and not frozen. F & D means that the product was frozen to −20 F., then allowed to thaw to 40° F. At this point, the viscosity of the emulsion is measured, then the emulsion is whipped. The whipped toppings are evaluated for whip time, specific gravity immediately after whipping, penetration in millimeters are measured with a precision penetrometer having 54.5 grams blunt bob, appearance after 4 hours standing at 40° F. and 4 hours at 75° F., degree of syneresis at 40° F. and 75° F. (referring to liquid separation from the topping). Column 1 represents acceptable standards for a commercial fluid whippable topping applied to 40° F. tests and F & D tests, the latter test, however, being more rigid.

Whipped Toppings A, B, C, D, E, and F represent whipped toppings all prepared in accordance with the above procedure, the only difference being in the level of emulsifier in the whipped topping and the type. Whipped Toppings A, B, and C employ the emulsifier of Example 1 at a level of 0.3 part, 0.6 part and 0.9 part respectively. Whipped Topping D contains 0.6 part emulsifier of Example 1 and 0.43 part of a commercial mono-diglyceride (mono) containing about 40–42% alpha-monoglyceride and about 45% diglyceride. Whipped Topping E contains 0.6 part of the emulsifier of Example 1 and 0.3 part of Polysorbate 60 (PS 60). Whipped Topping F contains 0.95 part of a commercial mono-diglyceride (mono) containing about 40–42% alpha-monoglyceride and 45% diglyceride. No polyoxyethylene triglycerol monostearate is used.

TABLE 1.—WHIPPED TOPPING COMPOSITIONS

Percent emulsion of—

| | Column 1 | A, 0.3 ETMS | | B, 0.6 ETMS | | C, 0.9 ETMS | | D, 0.6 ETMS, 0.43 Mono | | E, 0.6 ETMS, 0.3 PS 60 | | F, 0.95 mono | |
|---|---|---|---|---|---|---|---|---|---|---|---|---|---|
| | | 40° F. | F & D | 40° F. | F & D | 40° F. | F & D | 40° F. | F & D | 40° F. | F & D | 40° F. | F & D |
| Specific gravity | .37 [1] | .40 | .29 | .33 | .29 | .30 | .28 | .32 | .31 | .29 | .28 | .35 | Emulsion broke. |
| Penetration in mm.: | | | | | | | | | | | | | |
| Initial | 20.0 [1] | 2.5 | 10.9 | 2.3 | 11.0 | 4.6 | 5.7 | 2.4 | 6.9 | 3.0 | 6.1 | 1.1 | |
| 40° F | 15.0 [1] | 0.1 | 6.5 | 0.0 | 10.0 | 0.3 | 4.2 | 0.0 | 1.8 | 0.2 | 1.9 | 0.0 | |
| 75° F | 38.0 [1] | 3.2 | 39.8 | 6.2 | 42.6 | 8.9 | 40.8 | 0.0 | 35.2 | 0.0 | 35.2 | 0.0 | |
| Appearance after 4 hours at 40° F | Fair, dry, stiff | Dry, stiff | Fair, dry, stiff | Stiff, dry | Fair, dry, stiff | Dry, stiff | Dry, stiff | Dry, stiff | Fair, dry, stiff | Dry, stiff | Fair, dry, stiff | Very dry, stiff | |
| Syneresis | Slight | 0 | Fair, dry, stiff | 0 | Very slight | 0 | Very slight, wet, weak | 0 | Very slight | 0 | Very slight | 0 | |
| Appearance after 4 hours at 75° F | Slight, wet, weak | Fair, dry, stiff | Wet, weak | Fair, dry, stiff | Wet, weak | Very slight, wet, weak | Weak wet | Dry, stiff | Slight, wet, weak | Dry, stiff | Slight, wet, weak | Very dry, stiff | |
| Syneresis | Slight | Very slight | 0 | Very slight | 0 | Very slight | Very slight | 0 | 0 | 0 | 0 | 0 | |
| Whip time (Hobart K5A mixer) minutes | 10-minute [1] | 8.5 | 6.5 | 6.0 | 6.0 | 4.5 | 5.25 | 8.75 | 8.25 | 8.5 | 8.25 | 4.0 | |
| Viscosity (Brookfield Viscometer #2 spindle) | 300 cps. [1] | 120.0 | 130.0 | 187.5 | 165.0 | 225.0 | 205.0 | 167.5 | 170.0 | 205.0 | 182.5 | 208.0 | |

[1] Maximum.

What is claimed is:

1. In a fluid whippable topping composition comprising water, edible fat, protein and emulsifier, the improvement which comprises: including as at least 50% of said emulsifier a polyoxyalkylene derivative of a polyglycerol higher fatty acid ester, said polyoxyalkylene derivative having 10–50 alkylene oxide units per molar equivalent of polyglycerol therein, said alkylene oxide units being ethylene oxide or a mixture of ethylene oxide and propylene oxide units with not substantially more than 20% by weight of said ethylene oxide being propylene oxide.

2. The composition of claim 1 wherein said polyoxyalkylene derivative is present in a proportion of from 0.25–1.5% by weight of the composition.

3. The composition of claim 2 wherein said composition contains from about 20–30% edible fat, from about 0.5–2% protein, from about 0.25–1.5% emulsifier, from about 40–65% water, and from about 10–30% sugar, all percentages basis weight of the composition.

4. The composition of claim 3 wherein said polyoxyalkylene derivative of a polyglycerol higher fatty acid ester is a polyoxyethylene derivative of a polyglycerol higher fatty acid ester, said derivative having from 18–22 moles ethylene oxide per mole of polyglycerol ester.

5. The composition of claim 4 wherein said polyoxyethylene derivative is present in a proportion of from 0.6–1% by weight of the composition, and said derivative is predominantly the polyoxyethylene derivative of triglycerol monostearate.

6. The composition of claim 5 wherein the emulsifier in said composition is a combination of said polyoxyethylene derivative of a polyglycerol higher fatty acid ester and a glycerol fatty acid ester.

References Cited
UNITED STATES PATENTS

| | | | |
|---|---|---|---|
| 3,350,209 | 10/1967 | Rodgers | 99—139 |
| 3,353,965 | 11/1967 | Patterson | 99—139 |
| 3,431,117 | 3/1969 | Lorant | 99—139 |
| 3,490,918 | 1/1970 | Egan et al. | 99—144 |

ALVIN E. TANENHOLTZ, Primary Examiner

J. M. HUNTER, Assistant Examiner